United States Patent Office 3,053,819
Patented Sept. 11, 1962

3,053,819
COMPACTING WATER-SOLUBLE POLYMERS
OF ACRYLAMIDES
Joseph Carlin, Springdale, Conn., assignor to American Cyanamid Company, New York, N.Y., a corporation of Maine
No Drawing. Filed May 5, 1958, Ser. No. 732,791
10 Claims. (Cl. 260—80.5)

This invention relates to water-soluble polymers and more specifically the invention relates to polymers and copolymers of acrylamide. In particular, the invention relates to a method of densifying and otherwise upgrading acrylamido type polymers and copolymers containing a major proportion of polymers of this type. In a more specific sense, the invention relates to the improvement of dissolution characteristics of polymers of this type.

In the manufacture of polymers and copolymers of acrylamide and methacrylamide, the product after isolation and drying is usually in the form of a finely divided powdery material. Theoretically, polymers of this type are readily soluble even in cold water. In fact, the concentration of these polymers in water that can be obtained is limited only by the solution viscosity rather than by the solubility. However, in actual use of these polymers, considerable difficulty has been encountered in the dissolution thereof, undoubtedly due to the fine particle size of the dry material. On addition to water, even with rapid and thorough agitation, the polymer particles being of a small size tend to float, agglomerate, and encapsulate dry polymer, all making for slow dissolution. This behavior of the product when added to water in a normal manner results from difficulty in submerging and dispersing the polymer particles. The small particles will dissolve rapidly and completely if they could be sufficiently dispersed or submerged before agglomeration occurs. The time, procedure and effort required to prevent the formation of these gummy agglomerates of encapsulated material is impractical. Moreover, due to the fine particle size the material is difficult to handle in that unless extreme care is taken considerable dust will be generated. Also, the fine particle size contributes to handling losses resulting from dusting and seepage.

It is an object of the present invention to obviate the foregoing difficulties. More particularly, it is an object of the present invention to densify polymers and copolymers of acrylamide and to make granules thereof of substantially uniform size. It is a further object of the invention to provide a product having an increased dissolution rate. Further objects and advantages will become apparent as the description of the invention proceeds.

Among the water-soluble polymers which may be treated in accordance with the process of the present invention in addition to polymers and copolymers of acrylamide, methacrylamide and the methylol substituted derivatives thereof are acrylic acid and salts thereof such as sodium acrylate, potassium acrylate, lithium acrylate, ammonium acrylate and the like. Other polymers containing vinyl alcohol, vinyl sulfonate units and salts thereof may also be employed. The use of the above monomeric materials whether used to prepare homopolymers or copolymers with one another results in a polymeric material which is water-soluble and consequently may be employed in amounts up to as much as 90% with the acrylamide-type polymer, although the optimum advantages of the invention are in connection with homopolymers, and copolymers containing major amounts, of acrylamide. The use of other monomeric materials which contain a $CH_2=C<$ group and which have a more limited solubility in water are not precluded. Illustrative monomers of this type which may be used with the acrylamide type monomers set forth hereinabove but in minor amounts of the total copolymer are such as styrene, ring-substituted alkyl styrenes, such as ortho-methylstyrene, meta-methylstyrene, para-methylstyrene, 2,4-dimethylstyrene, 2,5 - dimethylstyrene, 3,4 - dimethylstyrene or the higher monoalkyl or polyalkyl ring-substituted styrenes, including the ethyl, propyl, butyl and the like. Useful copolymers, for example, are such as those prepared by copolymerizing acrylamide with acrylonitrile, in a weight ratio preferably in the range of about 75:25 to 95:5, respectively, and acrylamide-acrylic acid in a weight ratio of from about 95:5 to 5:95, respectively. In addition to acrylonitrile other nitriles such as methacrylonitrile, ethacrylonitrile, alpha-chloro-acrylonitrile, for example, may be used. Still further, one may use esters of acrylic acids such as methyl acrylate, ethyl acrylate, butyl acrylate, methyl methacrylate, ethyl methacrylate and the like and ring-substituted halo styrenes such as ortho, meta or para-methylstyrenes, 2,4-dichlorostyrene, 2,5-dichlorostyrene, and the like. In connection with the use of compounds which have a more limited solubility, such as the styrenes, the nitriles, the acrylates, and the like, these materials should be employed in minor amounts, i.e. generally not in excess of about 40% based on the total weight of the acrylamide copolymer, so as not to produce water insolubility.

The process of the present invention is applicable to water-soluble polymers having a fairly wide molecular weight range. For instance, materials ranging between 50,000 and 5,000,000 and even higher, average molecular weight, may be employed.

Such average molecular weights may be determined, for example, by the light scattering procedure as is known to those skilled in the art, see for example, P. J. Flory, Principles of Polymer Chemistry, Cornell University Press, 1953, pages 256–316. For a lower molecular weight polymer, the osmotic pressure method may be used. The concentration of the polymer in the polymerizing medium may vary over a fairly wide range depending upon the concentration and proportion of acrylamide content in the mixture.

The preparation of the polymers to be compacted according to the teachings of the invention may be effected by known procedures. With acrylamide, for example, polymerization may be effected in an aqueous medium in the presence of a suitable catalyst such as hydrogen peroxide or potassium persulfate. Molecular weights may be controlled by employing a water-miscible alcohol in the polymerization medium such as disclosed in U.S. Patent 2,486,191. The methylolation of the polyacrylamides may be effected by reacting an aqueous solution of polyacrylamide with formaldehyde in the presence of basic catalysts, preferably in the pH range of from about 8 to 10 for a period of about one hour. It is preferred that the pH be maintained in said range during preparation and processing. Polyacrylamide or the methylolated polyacrylamide so prepared may be drum dried or spray dried by conventional procedure and used as a dry, finely divided powder. The acrylamide polymer or copolymer may, after polymerization, be separated from its aqueous polymerization medium by the emulsion precipitation procedure of pending U.S. patent application, Serial No. 687,591 wherein a water-in-oil emulsion with the polymer-water solution as the discontinuous phase and xylene, or the like, as the continuous phase, is dispersed in a polymer nonsolvent causing precipitation of the polymer from the water solution thereof, which precipitated polymer is separated from the liquid phases and dried. The polymer may also be recovered from solution by the procedure of U.S. patent application, Serial No. 689,757, wherein a nonsolvent is used to effect separation by a two-step precipitation procedure and the precipitated polymer is subsequently separated and dried.

The dried product normally obtained contains substantial amounts of fines which are difficult to handle and in addition cause dust and storage problems. The dusty fines invariably lead to waste and are notorious for causing annoyance and commercial unattractiveness in a product. By compacting the material according to the present invention, the polymeric product is substantially upgraded. In essence, the procedure involves mechanically compacting the polymer by any suitable procedures, such as by hydraulic press, or by way of any of well known pressure encapsulating or pilling or pelletizing machines to a specific gravity greater than 1 or more specifically to a density greater than that of water, and subsequently granulating the compacted material. The compacting pressures may vary over a fairly wide range depending on the initial condition of the polymer, e.g. moisture content, fineness of particle, and the like. Generally, a compacting pressure of at least 5,000 pounds per square inch is necessary. There is generally no upper limit as to the compacting pressures which may be employed other than that imposed by practical limitations on the apparatus. No additional advantage is known in employing pressures in excess of about 50 tons per square inch. In compacting the material, a suitable lubricant, such as sodium oleate, zinc stearate, calcium stearate, glycerol monostearate, zinc palmitate and the like is preferably incorporated with the polymer to prevent the compressed polymer from adhering to the compacting apparatus. If desired, a suitable inert binder such as propylene glycol or other water-soluble material may be incorporated with the polymer to enhance the compaction of the polymer and to permit the use of somewhat lower compacting pressures. However, it is preferred that such additives be omitted to avoid dilution of the polymeric product and because of the difficulty of homogeneously blending these materials. An intermediate chopping step to facilitate granulating may be employed when the polymer is compacted in the form of large slabs or pieces.

The compacted polymer is next reduced in size by granulation. In practice, it is desirable to minimize production of fines during granulation. To this end, it is often desirable to utilize a number of steps starting with a coarse reduction and proceeding to finer reductions with appropriate recycle of screened out fines to compacting and coarse material to granulation. The method of granulation does not effect this invention, except in the area of economics.

The sizing of the granulated compacted polymer is not critical. However, good dissolution rates are obtained when the product is screened so that it has a mesh size not larger than about 12 and not smaller than about 48 and preferably a mesh size not larger than 18 nor smaller than 40.

In order that the present invention may be more completely understood, the following examples are set forth for the purpose of illustration and any specific enumeration of detail should not be interpreted as a limitation except as indicated in the appended claims.

EXAMPLE 1

100 parts of kiln dried polyacrylamide prepared by polymerization of the monomer in an aqueous system in the presence of a peroxygen catalyst and separated from the aqueous mother liquor according to the emulsion precipitation technique described in Example 1 of the application, Serial No. 687,591 is mixed with 0.05 part of sodium stearate as lubricant and compacted under a pressure of approximately 30 tons per square inch into ⅜ inch pellets. The pelleted polymer is comminuted and sized, 18–40 mesh. The fines of lesser size than 40 mesh are recirculated to the compacting step and the coarse particles remaining on the 18 mesh sizer are returned to the comminuter. The compacted material (10 parts) when added to water (150 parts) immerses and disperses rapidly and dissolves completely upon stirring, i.e. it is completely dissolved even in large quantities in less than 30 minutes. In comparison, a substantial proportion of an equal quantity of the same polymer which is not compacted when added to water with vigorous stirring did not dissolve even after 4 hours.

EXAMPLE 2

100 parts of polyacrylamide derived from the procedure of Example 1 of Serial No. 687,591 is compacted on a briqueting type roll to provide a sheet consisting of briquets and interconnecting webbing. The compacting rolls are operated at a pressure of 16,000 lbs./linear inch. The sheet is chopped into pieces and passed through a granulator and sized as in Example 1 to produce a granulated product having a mesh size of 18–40. When added to water, the granulated product immerses and disperses rapidly and dissolves completely in 45 minutes. A sample of the same polymer but noncompacted when introduced into water under the same conditions is substantially undissolved after 4 hours.

EXAMPLE 3

100 parts of an acrylamide-acrylic acid copolymer of 50 parts acrylamide and 50 parts acrylic acid is compacted into ⅜ inch pellets according to the process of Example 1 with the exception that a pressure of 18 tons per square inch is applied. After sizing (18–40 mesh), a sample quantity of 10 parts when introduced with stirring to 150 parts of water immerses and disperses rapidly and dissolves completely in 43 minutes. When an equal quantity of the same polymer, but noncompacted, is introduced to the same quantity of water, a substantial quantity of polymer agglomerates are found and remain undissolved after 3½ hours. After doubling the quantity of water and stirring for an additional one hour, the quantity of agglomerated material is not substantially diminshed.

EXAMPLE 4

100 parts of an acrylamide-acrylonitrile copolymer of 80 parts acrylamide and 20 parts acrylonitrile is compacted under the conditions and processed according to the procedure of Example 1. Ten parts of the compacted material when introduced into 200 parts of water with stirring dissolved completely in 38 minutes. A control run made with equal quantities using the noncompacted material has a substantial quantity of undissolved polymer left even after 4 hours of stirring.

EXAMPLES 5–10

The following examples, results of which are set forth in Table I, show the advantages of compacting additional polymers according to the procedure of the invention. The procedure and conditions are those of Example 1. The solution tests are made with 10 parts of polymer in 150 parts of water. Maximum solution recording time is 4 hours.

Table I

| Example | Polymer | Weight Ratio, respectively | Immersion Time at 35°C | | Dissolution Time | | | | | |
|---|---|---|---|---|---|---|---|---|---|---|
| | | | Compacted (min.) | Non-compacted (hrs.) | Compacted (min.) | | | Noncompacted (hrs.) | | |
| | | | | | 16° C. | 35° C. | 70° C. | 16° C. | 35° C. | 70° C. |
| 5 | Acrylamide-methylstyrene | 85:15 | 9 | 4 | 89 | 57 | 28 | 4 | 4 | 3 |
| 6 | Acrylamide-methylstyrene-acrylonitrile | 80:10:10 | 6–7 | 4 | 83 | 52 | 22 | 4 | 4 | 3 |
| 7 | Acrylamide-diallyl dimethyl ammonium chloride | 96:4 | 7–8 | 4 | 97 | 64 | 31 | 4 | 4 | 3 |
| 8 | Acrylamide-acrylic acid | 90:10 | 7 | 3.0 | 80 | 46 | 21 | 4 | 3.6 | 2.0 |
| 9 | Methacrylamide-sodium acrylate | 95:5 | 8 | 4 | 101 | 70 | 33 | 4 | 4 | 2.75 |
| 10 | Methylolpolyacrylamide | | 8–9 | 3.0 | 79 | 58 | 26 | 4 | 3.2 | 2.5 |

I claim:
1. A method of improving the dissolution rate of water-soluble polymeric material of the group consisting of polymers of acrylamide and methacrylamide and methylolated derivatives thereof, which comprises densifying the solid water-soluble polymer to a specific gravity greater than 1 in the dried state and under mechanical pressure of at least 5,000 pounds per square inch.

2. A method of improving the dissolution rate of water-soluble polymeric material of the group consisting of polymers of acrylamide and methacrylamide and methylolated derivatives thereof, which comprises densifying the solid water-soluble polymer to a specific gravity greater than 1 in the dried state and under mechanical pressure of at least 5,000 pounds per square inch and thereafter granulating said densified polymer.

3. A method of improving the dissolution rate of solid polyacrylamide in water which comprises densifying said polymer having a specific gravity less than 1 under mechanical pressure and in the dried state until the specific gravity of said polymer is in excess of 1.

4. A method of improving the dissolution rate of solid polyacrylamide in water which comprises densifying said polymer having a specific gravity less than 1 under mechanical pressure and in the dried state until the specific gravity of said polymer is in excess of 1 and thereafter granulating said polymer until it has a mesh size not larger than 18 and not smaller than 40.

5. A method of improving the dissolution rate of solid polymethacrylamide in water which comprises densifying said polymer having a specific gravity less than 1 under mechanical pressure and in the dried state until the specific gravity of said polymer is in excess of 1.

6. A method of improving the dissolution rate of solid methylolpolyacrylamide in water which comprises densifying said polymer having a specific gravity less than 1 under mechanical pressure and in the dried state until the specific gravity of said polymer is in excess of 1 and thereafter granulating said polymer until it has a mesh size not larger than 18 and not smaller than 40.

7. A method of improving the dissolution rate of solid methylolpolymethacrylamide in water which comprises densifying said polymer having a specific gravity less than 1 under mechanical pressure and in the dried state until the specific gravity of said polymer is in excess of 1 and thereafter granulating said polymer until it has a mesh size not larger than 18 and not smaller than 40.

8. A method of improving the dissolution rate of acrylamide-acrylonitrile copolymer in water which comprises densifying said polymer having a specific gravity less than 1 under mechanical pressure and in the dried state until the specific gravity of said polymer is in excess of 1.

9. A method of improving the dissolution rate of acrylamide-acrylic acid copolymer in water which comprises densifying said polymer having a specific gravity less than 1 under mechanical pressure and in the dried state until the specific gravity of said polymer is in excess of 1.

10. A method of improving the dissolution rate of acrylamide - acrylonitrile - methylstyrene tripolymer in water which comprises densifying said polymer having a specific gravity less than 1 under mechanical pressure and in the dried state until the specific gravity of said polymer is in excess of 1 and thereafter granulating said polymer until it has a mesh size not larger than 18 and not smaller than 40.

References Cited in the file of this patent
UNITED STATES PATENTS

| | | |
|---|---|---|
| 2,056,794 | Macht et al. | Oct. 6, 1936 |
| 2,309,522 | Marks | Jan. 26, 1943 |
| 2,533,166 | Jones | Dec. 5, 1950 |
| 2,573,639 | Coler | Oct. 30, 1951 |
| 2,779,974 | Billing et al. | Feb. 5, 1957 |
| 2,800,463 | Morrison | July 23, 1957 |